United States Patent [19]

Dang et al.

[11] Patent Number: 5,610,777
[45] Date of Patent: Mar. 11, 1997

[54] METHOD AND APPARATUS FOR WRITING SERVO TRACKS OF A MAGNETIC DISK UNIT WHICH USES A PROBE TO CONTROL THE POSITIONING OF THE HEAD

[75] Inventors: Hien P. Dang, Nanuet, N.Y.; Takahiro Nakagawa; Yoshiyasu Nakamoto, both of Fujisawa, Japan; Muthuthamby Sri-Jayantha, Ossining, N.Y.; Hiroyuki Suzuki, Fujisawa, Japan

[73] Assignee: International Business Machines Corporation, Armonk, N.Y.

[21] Appl. No.: 608,206

[22] Filed: Feb. 28, 1996

Related U.S. Application Data

[63] Continuation of Ser. No. 233,163, Apr. 24, 1994, abandoned.

[30] Foreign Application Priority Data

Apr. 27, 1993  [JP]  Japan ................... 5-101457

[51] Int. Cl.$^6$ ................................. G11B 5/596
[52] U.S. Cl. ..................... 360/77.03; 360/78.11; 360/77.02; 360/75
[58] Field of Search ............. 360/77.03, 78.11, 360/69, 75, 77.02, 78.01, 78.04; 369/44.26, 44.32, 53, 54

[56] References Cited

U.S. PATENT DOCUMENTS

| | | | |
|---|---|---|---|
| 5,227,625 | 7/1993 | Hebzler | 360/77.03 |
| 5,268,801 | 12/1993 | Hazel et al. | 360/77.03 |
| 5,315,372 | 5/1994 | Tsai | 360/77.03 |
| 5,319,509 | 6/1994 | Michelson et al. | 360/72.1 |
| 5,325,349 | 6/1994 | Taniguchi | 360/77.03 |

OTHER PUBLICATIONS

IBM Technical Disclosure Bulletin, vol. 23, No. 3, Aug. 1980, pp. 1234 to 1235, entitled "Writing Servo Patterns in Disk Files" by A. Bennett et al. pp. 1234–1235.

Primary Examiner—Andrew L. Sniezek
Assistant Examiner—Larry T. Cullen
Attorney, Agent, or Firm—Richard E. Billion; Michael F. Hoffman

[57] ABSTRACT

The present invention relates to a method and apparatus for writing servo tracks of a magnetic disk unit, and has an object of providing a servo track writing method and apparatus which can reduce a mechanical vibration of a head in the steady state and can shorten a settling time of the system. A detecting face is set in the vicinity of a head arm end portion 22 of a magnetic disk unit 2, and a capacitance probe 28 is provided as a gap detecting means for detecting a gap in a head moving direction between the detecting face and the head arm end portion 22. Further provided are a rotary positioner 26 as a positioning means for moving the capacitance probe 28 in the head moving direction to position it at a target position, and a head drive system control means for moving a head 14 of the magnetic disk unit 2 so that the gap is kept constant, to position the head 14 at a predetermined servo track writing position.

15 Claims, 10 Drawing Sheets

METHOD AND APPARATUS FOR WRITING SERVO TRACKS OF A MAGNETIC DISK UNIT WHICH USES A PROBE TO CONTROL THE POSITIONING OF THE HEAD

This application is a continuation of application Ser. No. 08/233,163, filed Apr. 24, 1994, now abandoned.

BACKGROUND OF THE INVENTION

The present invention relates to a method and apparatus for writing servo tracks of a magnetic disk unit. In recent years, with an increasing demand for compact, large-capacity magnetic disk units (HDDs), magnetic disk units with disks having such a high information recording density as exceeding 100 megabits per square inch are now required.

To provide high-density disks, it is necessary to increase the number of tracks per inch in the disk radial direction (TPI: tracks per inch). In near future, to manufacture compact, large-capacity magnetic disk units as mentioned above, a track density more than 3,000 TPI will be needed. To attain the track density of 3,000 TPI, the pitch of tracks formed on the disk surface should be smaller than 10 µm.

Therefore, more accurate head positioning is required in writing servo tracks onto the disk surface.

With reference to FIG. 11, a conventional servo track writing apparatus for a magnetic disk unit is described below. FIG. 11 is a plan view showing part of a servo track writing mechanism, in which a magnetic disk unit 2 as a subject of servo track writing is already placed on a stone surface plate 20.

First, components of the magnetic disk unit 2 is briefly described. A spindle motor 6 is mounted on a baseplate 4 of the magnetic unit 2, and a plurality of disks 8 are fixedly attached to a rotary shaft of the spindle motor 6. A rotary actuator 12 for moving a head 14 in the radial direction of the disks 8 is rotatably mounted with a pivot 10, which is fixed to the baseplate 4 outside the disks 8, as its rotary shaft. A voice coil motor (VCM) 16 for driving the rotary actuator 12 is disposed on the side of the pivot 10 opposite to the head 14. A protrusion 17 is formed on the VCM 16, and the tip of a linear positioner 18 for positioning the head 14 contacts with the protrusion 17.

The linear positioner 18 is a part of a servo track writing mechanism, and mounted on the stone surface plate 20 outside the magnetic disk unit 2 so that its tip contacts with the protrusion 17 of the VCM 16 of the magnetic disk unit 2. Driven by a driving device (not shown), the linear positioner 18 can move straight by a predetermined distance.

Next, a servo track writing method with the conventional servo track writing apparatus of FIG. 11 is briefly described. The linear positioner 18 is linearly moved by a predetermined distance and the tip of the linear positioner 18 pushes the protrusion 17 so that the head 14 moves by one track pitch. Pushed by the tip 17, the rotary actuator 12 rotates about the pivot 10 by a predetermined angle, so that the head 14 moves in the radial direction of the disks 8. During the above operation, a bias current is supplied to the VCM 16 to generate a balancing force in the direction opposite to the force exerted by the linear positioner 18, to ensure that the protrusion 17 is kept in contact with the tip of the linear positioner 18 (rigid-body-type contact).

As described above, in the conventional servo track writing, the head 14 for the servo track writing is positioned using the linear positioner 18 that links with the rotary actuator 12, which supports the head 14, through the protrusion 17.

However, the above conventional servo track writing method and apparatus is associated with various problems for the purpose of writing servo tracks of a magnetic disk unit that is required to have a high track density of more than 3,000 TPI.

As one problem, since the linear positioner 18 makes a linear movement in contrast to the rotational movement of the head 14 about the pivot 10, an error occurs in positioning the head 14 and is difficult to compensate. Another problem is that intermittent slips of a submicron order occur at the contact point of the linear positioner 18 and the protrusion 17 to increase the track pitch error.

Recently, the above problems have been solved by replacing the linear positioner 18 with a rotary positioner having a rotation axis that coincides with the rotation axis of the pivot 10. However, the following problems still arise even with the rotary positioner.

Even in the steady state after the head 14 has been positioned at a predetermined servo track writing position, a mechanical vibration at a resonance frequency that cannot be followed by the positioning servo occurs in the head 14 with an influence of the mass the linear positioner 18 (or rotary positioner) that is in rigid-body-type contact with the rotary actuator 12. For example, according to measurements with a magnetic disk unit used by the inventors and a conventional servo track writing apparatus, a vibration of 0.17 µm in peak-to-peak amplitude at a frequency 560 Hz which cannot be followed by a servo system occurred in the steady state with an influence of the mass of a positioner.

In positioning the head 14, the forces of the linear positioner 18 and the VCM 16 are balanced with each other to provide the rigid-body-type coupling between the protrusion 17 and the linear positioner 18 (or rotary positioner). As a result, when the linear positioner 18 makes a step-function-type movement corresponding to one track pitch, a mechanical vibration occurs in the rotary actuator 12 as a transient response to such a step-like movement. That is, due to the large inertial mass of the linear positioner 18, the transient response to the step-like movement for the one-track seek of the head 14 does not attenuate in a short period, to make the settling time of the system longer. FIG. 12 shows a head settling time with the magnetic disk unit used by the inventors and the conventional servo track writing apparatus. As shown in FIG. 12, a settling time necessary to settle at a target position of 5 µm is 12 milliseconds. If the head settling time is too long in a magnetic disk unit equipped with disks having a track density as high as 3,000 TPI, the throughput of the servo track writing step reduces by a non-negligible amount.

A further problem is that in the servo track writing in an actual manufacturing process the opening for the servo track writing to be formed in a top cover of a magnetic disk unit cannot be made large.

SUMMARY OF THE INVENTION

The present invention has been made to solve the above problems in the art, and has an object of providing a servo track writing method add apparatus which can reduce a mechanical vibration of a head in the steady state, to thereby secure the stability of a servo system.

Another object of the invention is to provide a servo track writing method and apparatus which can reduce a settling time of the system to thereby improve a throughput of a step of writing servo tracks of a magnetic disk unit.

A further object of the invention is to provide a servo track writing method and apparatus more adapted for practicing in an actual manufacturing process.

The above objects can be attained by the following method for writing servo tracks of a magnetic disk unit. A detecting portion is set in the vicinity of a head support member of the magnetic disk unit in a noncontacting manner, and a gap in a head moving direction between the detecting portion and the head support member is detected. The detecting portion is moved in the head moving direction so as to be positioned at a target position while, and, at the same time, a head of the magnetic disk unit is moved so that the gap is kept constant, to position the head at a predetermined servo track writing position.

The above objects can also be attained by the following method for writing servo tracks of a magnetic disk unit. A detecting portion is set in the vicinity of a head support member of the magnetic disk unit in a noncontacting manner, and a gap in a head moving direction between the detecting portion and the head support member is detected. A head of the magnetic disk unit is sequentially positioned at a plurality of servo track writing positions by driving a head drive system of the magnetic disk unit and controlling the head drive system by feeding back the detected gap while sequentially changing a head target position. The detection of the gap is C in a measurement range in which linearity of an output of the detecting portion is maintained. When the detecting portion reaches one of measurement limits of the measurement range, the detecting portion is moved to the other measurement limit of the measurement range.

The above objects can also be attained by the following method for writing servo tracks of a magnetic disk unit. A detecting portion is set at an edge portion of a head support member of the magnetic disk unit in a noncontacting manner, and the detecting portion is moved in a head moving direction so as to be positioned at a target position while a deviation in the head moving direction between the detecting portion and the edge portion is detected. At the same time, a head of the magnetic disk unit is moved so that the deviation is kept constant, to position the head at a predetermined servo track writing position.

The above objects can be attained by the following apparatus for writing servo tracks of a magnetic disk unit. A gap detecting means is provided which has a detecting portion located in the vicinity of a head support member of the magnetic disk unit in a noncontacting manner, and detects a gap in a head moving direction between the detecting portion and the head support member. Also provided are a positioning means for moving the gap detecting means in the head moving direction to position it at a target position, and a head moving means for moving a head of the magnetic disk unit so that the gap is kept constant, to position the head at a predetermined servo track writing position.

The head moving means may comprise a head drive system control means for controlling a head drive system of the magnetic disk unit by feeding back the detected gap. The gap detecting means may be a capacitance probe.

The positioning means may comprise a position control means for performing feedback control by detecting a current position of the gap detecting means. The positioning means may be a rotary positioner.

The above objects can also be attained by the following apparatus for writing servo tracks of a magnetic disk unit.

An edge detecting means is provided which has a detecting portion located in the vicinity of an edge portion of a head support member of the magnetic disk unit in a noncontacting manner, and detects a deviation in a head moving direction between the detecting portion and the edge portion. Also provided are a positioning means for moving the edge detecting means in the head moving direction to position it at a target position, and a head moving means for moving a head of the magnetic disk unit so that the deviation is kept constant, to position the head at a predetermined servo track writing position.

The head moving means may comprise a head drive system control means for controlling a head drive system of the magnetic disk unit by feeding back the detected gap. The gap detecting means may be a capacitance probe that is set perpendicularly to a top surface of the head support member.

The positioning means may comprise a position control means for performing feedback control by detecting a current position of the edge detecting means. The positioning means may be a rotary positioner.

According to the invention, the detecting portion is moved in the head moving direction to position it at the target position while the gap in the head moving direction between the detecting portion and the head support member is detected in a noncontacting manner. At the same time, the head of the magnetic disk unit is moved so that the gap is kept constant, to position the head at the predetermined servo track writing position. Therefore, the mechanical vibration of the head in the steady state can be reduced.

Further, according to the invention, the gap in the head moving direction between the detecting portion and the head support member is detected in a noncontacting manner. The head of the magnetic disk unit is sequentially positioned at a plurality of servo track writing positions by driving the head drive system of the magnetic disk unit and controlling the head drive system by feeding back the detected gap while sequentially changing the head target position. The detection of the gap is in the measurement range in which linearity of the output of the detecting portion is maintained. When the detecting portion reaches one of the measurement limits of the measurement range, the detecting portion is moved to the other measurement limit of the measurement range. Therefore, the servo track writing becomes possible in which the settling time of the system is shortened and the throughput of the step of writing the servo tracks of the magnetic disk unit can be improved.

Further, according to the invention, the detecting portion is set at the edge portion of the head support member of the magnetic disk unit in a noncontacting manner, and the detecting portion is moved in the head moving direction so as to be positioned at the target position while the deviation in the head moving direction between the detecting portion and the edge portion is detected. At the same time, the head of the magnetic disk unit is moved so that the deviation is kept constant, to position the head at a predetermined servo track writing position. Therefore, the servo track writing method and apparatus can be realized which are more adapted for practicing in an actual manufacturing process.

DETAILED DESCRIPTION OF THE PREFERRED EMBODIMENT

Figure 1:
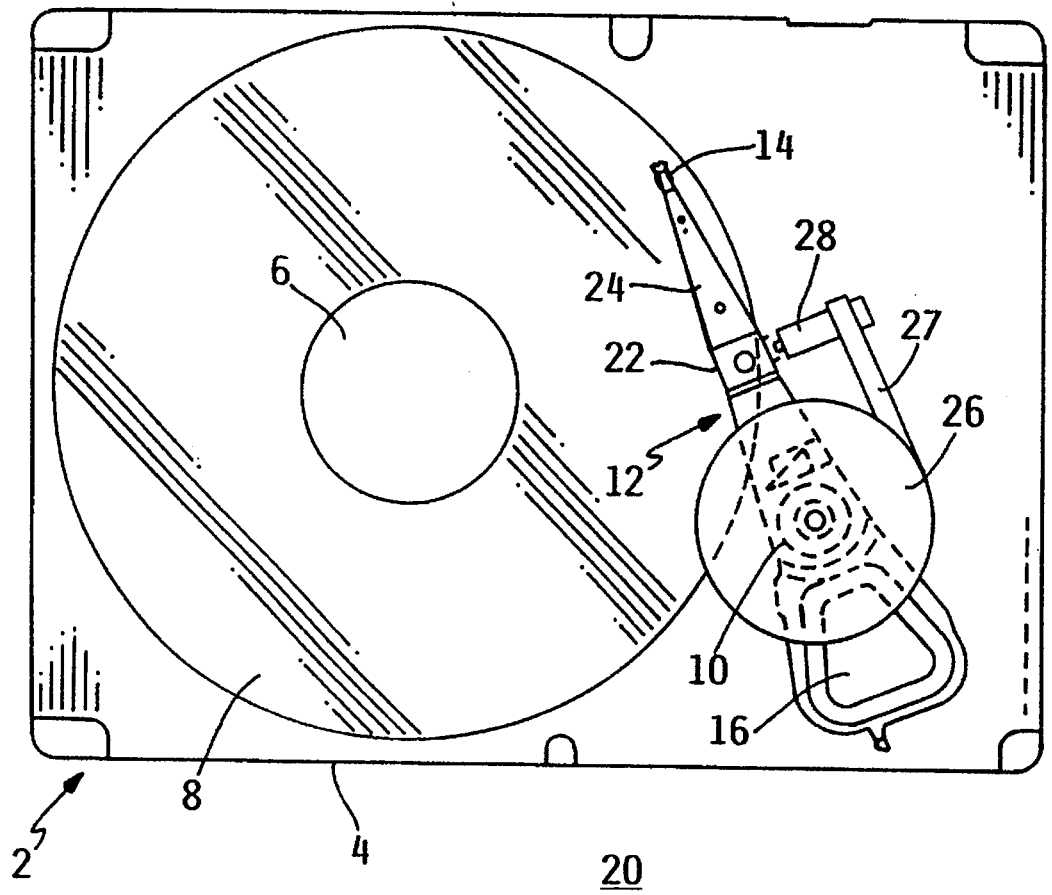
FIG. 1 is a plan view of an apparatus for writing servo tracks of a magnetic disk unit according to a first embodiment of the invention.

With reference to FIGS. 1–3, a method and apparatus for writing servo tracks of a magnetic disk unit according to a first aspect of the present invention is described below. FIG. 1 is a plan view showing part of a servo track writing mechanism according to this embodiment, in which a magnetic disk unit 2 as a subject of servo track writing is already placed on a stone surface plate 20 of a servo track writing apparatus. FIG. 2 is a perspective view of the servo track writing mechanism of this embodiment.

First, components of the magnetic disk unit 2 as the subject of the servo-track writing is briefly described. A spindle motor 6 is mounted on a baseplate 4 of the magnetic unit 2, and a plurality of disks 8 are fixedly attached to a rotary shaft of the spindle motor 6 so as to be rotatable with the rotation of the spindle motor 6. A rotary actuator 12 for moving a head 14 in the radial direction of the disks 8 is rotatably mounted with a pivot 10, which is fixed to the baseplate 4 outside the disks 8, as its rotary shaft. The head 14 is attached to a the tip of a head support member 24 that extends from a head arm end portion. 22. A voice coil motor (VCM) 16 for driving the rotary actuator 12 is disposed on the side of the pivot 10 opposite to the head 14.

Servo tracks are written onto the disks 8 in the state that the above magnetic disk unit 2 is placed on the stone surface plate 20 of the servo track writing apparatus of the invention at a predetermined position.

A rotary positioner 26, which is a part of the servo track writing apparatus of the invention, is supported by a support member (not shown) fixed to the stone surface plate 20 and rotatably mounted over the pivot 10 of the magnetic disk apparatus 2. The position of the rotary positioner 26 is adjusted so that the rotation axes of the rotary positioner 26 and the pivot 10 of the magnetic disk unit 2 coincide with each other. The rotary positioner 26 includes a laser rotary encoder and a DC servo motor using air bearings (both not shown). The laser rotary encoder is a positional information detecting means for outputting positional information to be used for moving the head 14 of the magnetic disk unit 2 as the subject of the servo track writing and positioning it at the next servo track writing position.

The rotary positioner 26 supports a capacitance probe 28 through a support member 27. The capacitance probe 28 is so constructed as to move with a 0.1 µm accuracy together with the rotating rotary positioner 26. Thus, the rotary positioner 26 is a positioning means for positioning the capacitance probe 28 by feeding back the positional information from the laser rotary encoder by a feedback circuit.

Figure 2A:
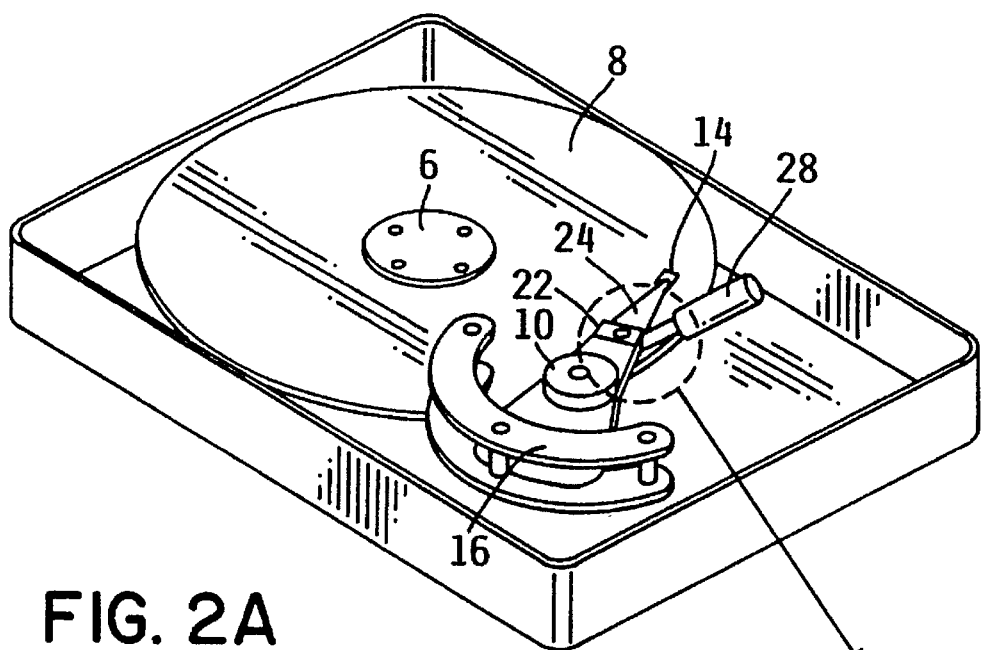
FIGS. 2(a) and (b) are perspective views of the apparatus for writing servo tracks of a magnetic disk unit according to the first embodiment of the invention.
Figure 2B:
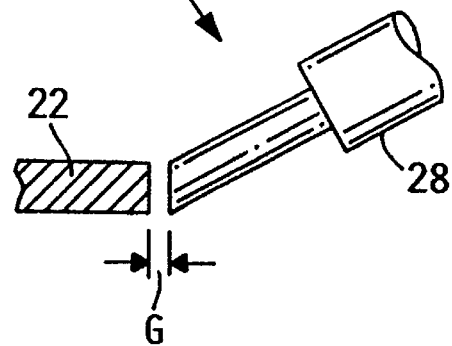

The capacitance probe 28 extends obliquely downward from the support member 27 (see FIG. 2(a)), and its tip face is opposed to a side face of the head arm end portion 22 of the magnetic disk unit 2 with a gap in between (see FIG. 2(b)). In this embodiment, the capacitance probe 28 is used to measure the gap between the tip face of the capacitance probe 28 and the head arm end face 22 of the magnetic disk unit 2. The capacitance probe 28 (manufactured by AGE Co.) used in the embodiment can measure the gap in the range of 165±50 µm with a full-scale linearity of 0.2%. The output of the capacitance probe 28 is ±10 V for the range of ±50 µm.

The capacitance probe 28 is fixed to the rotary positioner 26 as the positioning means. Having a detecting portion that is opposed to a head support member 24 (such as a head arm) for supporting the head 14 in the head moving direction in a noncontacting manner, the capacitance probe 28 is a gap detecting means for detecting the gap in the head moving direction between the detecting portion and the head support member 24.

Figure 3A:
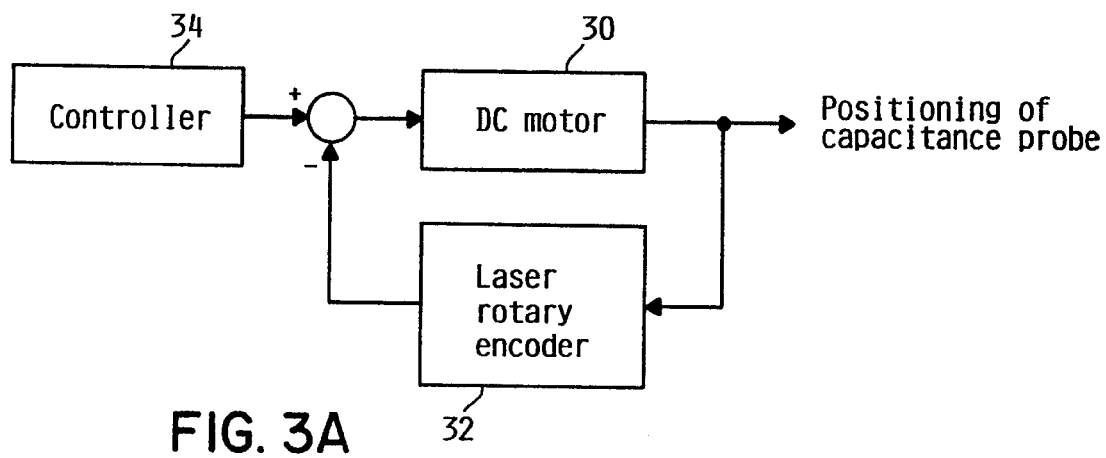
FIGS. 3(a) and (b) include block diagrams showing the operation of a servo system of the apparatus for writing servo tracks of a magnetic disk unit according to the first embodiment of the invention.
Figure 3B:
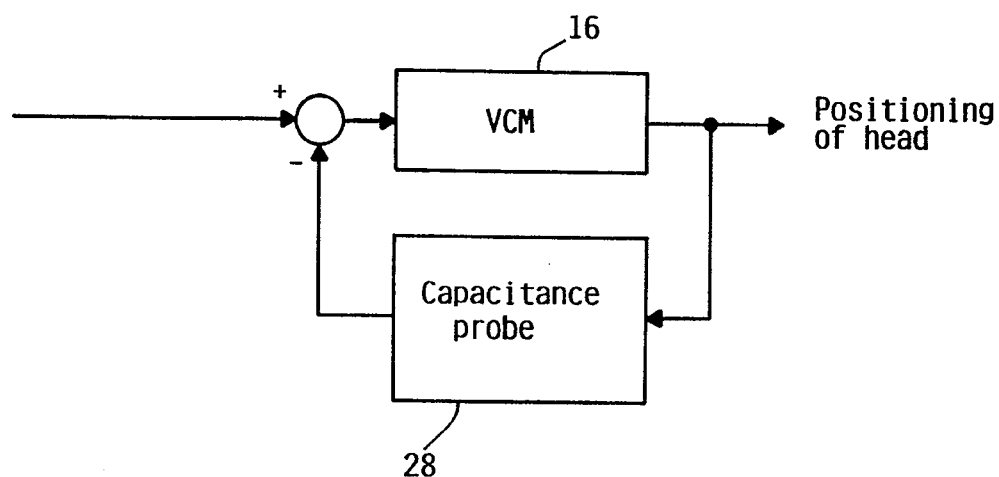

Next, with reference to FIGS. 1–3, the servo track writing method according to this embodiment is described. FIG. 3 is a block diagram showing the operation of servo systems of the apparatus of the embodiment for writing servo tracks of the magnetic disk unit. FIG. 3(a) is a block diagram of a servo system that is a position control means for the rotary positioner 26, and FIG. 3(b) is a block diagram of another servo system that is a head drive system control means for controlling the VCM 16 so that the gap between the tip face of the capacitance probe 28 and the side face of the head arm end portion 22 is kept constant.

A controller 34 inputs a target value for one-track seek (movement) of the head 14 to a DC servo motor 30 of the rotary positioner 26. With the driving of the DC motor 30, the rotation angle of the DC motor 30 is controlled while an error signal is fed back based on positional information measured by a laser rotary encoder 32, and the rotary positioner 26 is rotated correctly by the predetermined movement value (target movement value of the head 14). With the rotation of the rotary positioner 26, the capacitance probe 28 also rotates correctly by the predetermined movement value so as to be positioned at the predetermined position (FIG. 3(a)).

On the other hand, a VCM current is supplied to the VCM 16 of the rotary actuator 12 of the magnetic disk apparatus 2 so that the gap between the tip face of the capacitance probe 28 and the side face of the head arm end portion 22, and an error signal is fed back based on the gap detected by the capacitance probe 28 to control the VCM current (FIG. 3(b)). As a result, the rotary actuator 12 is driven so as to follow the movement of the capacitance probe 28 while keeping the constant gap, so that the head 14 is positioned at the predetermined track.

While the head 14 is positioned at the predetermined servo track writing positions in a noncontacting manner as described above, servo tracks are written onto the disks 8 of the magnetic disk unit 2.

When the servo track writing step is finished, the magnetic disk unit 2 is removed from the stone surface plate 20 and the next step is performed.

According to this embodiment, the rotary actuator 12 and the capacitance probe 28 are not in contact with each other in the steady state (servo track writing) in which the head 14 has been positioned at the predetermined servo track writing position. Therefore, the influence of the mass of the rotary positioner side is negligible, and it can be prevented that a mechanical vibration would occur in the head 14 at a resonance frequency that cannot be followed by the positioning servo. This embodiment realized the servo track writing method and apparatus in which the amplitude of the vibration at about 560 Hz that cannot be followed by the servo system of the magnetic disk unit used in the embodiment was reduced to a negligible level, and the mechanical vibration in the steady state was reduced.

Figure 4:
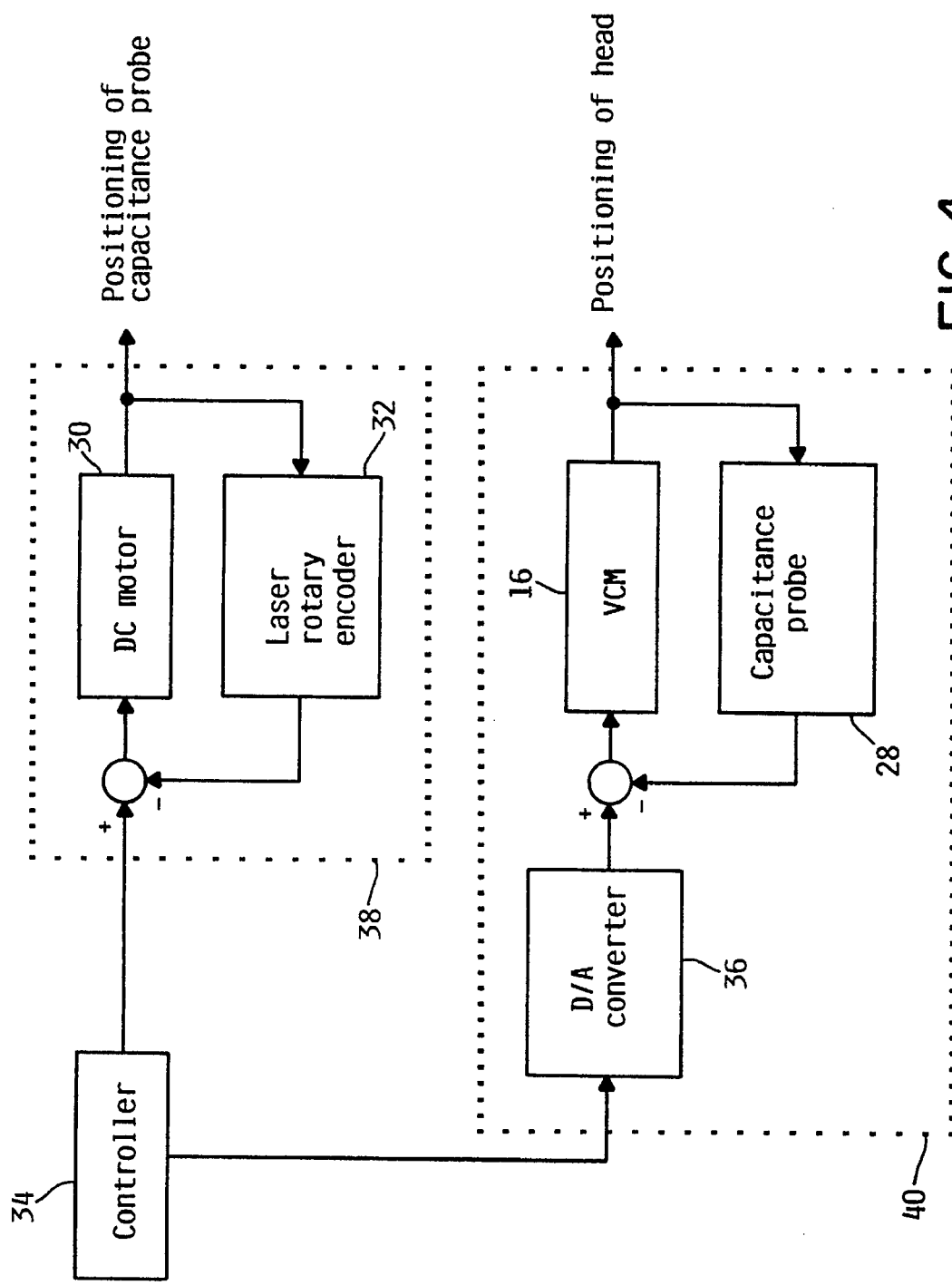
FIG. 4 is a block diagram showing the operation of a servo system of an apparatus for writing servo tracks of a magnetic disk unit according to a second embodiment of the invention.
Figure 5:
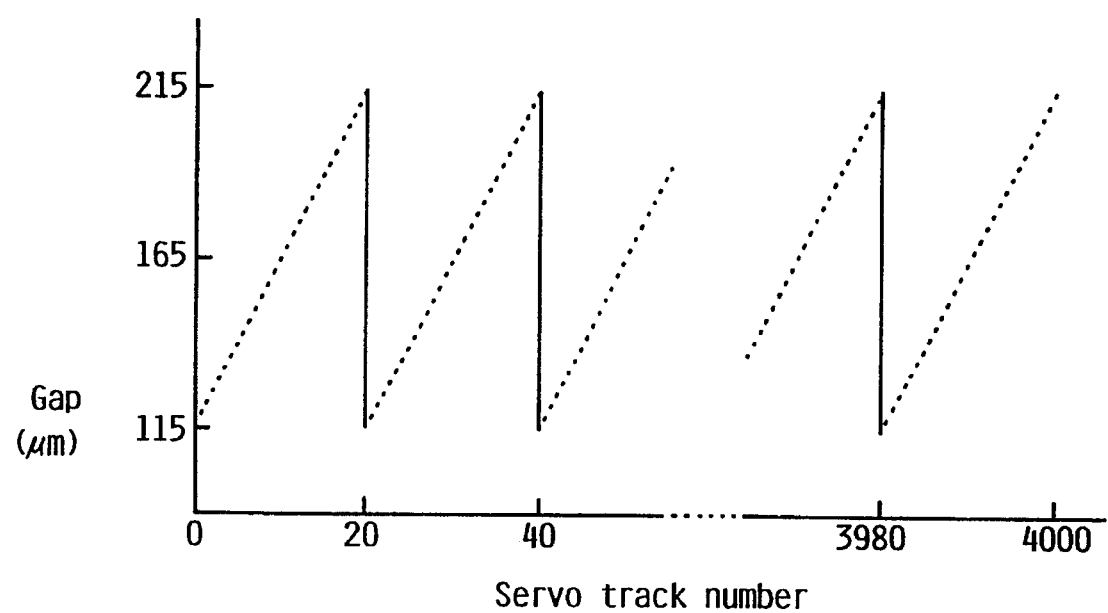
FIG. 5 is a graph showing a servo track writing method according to the second embodiment of the invention.
Figure 6:
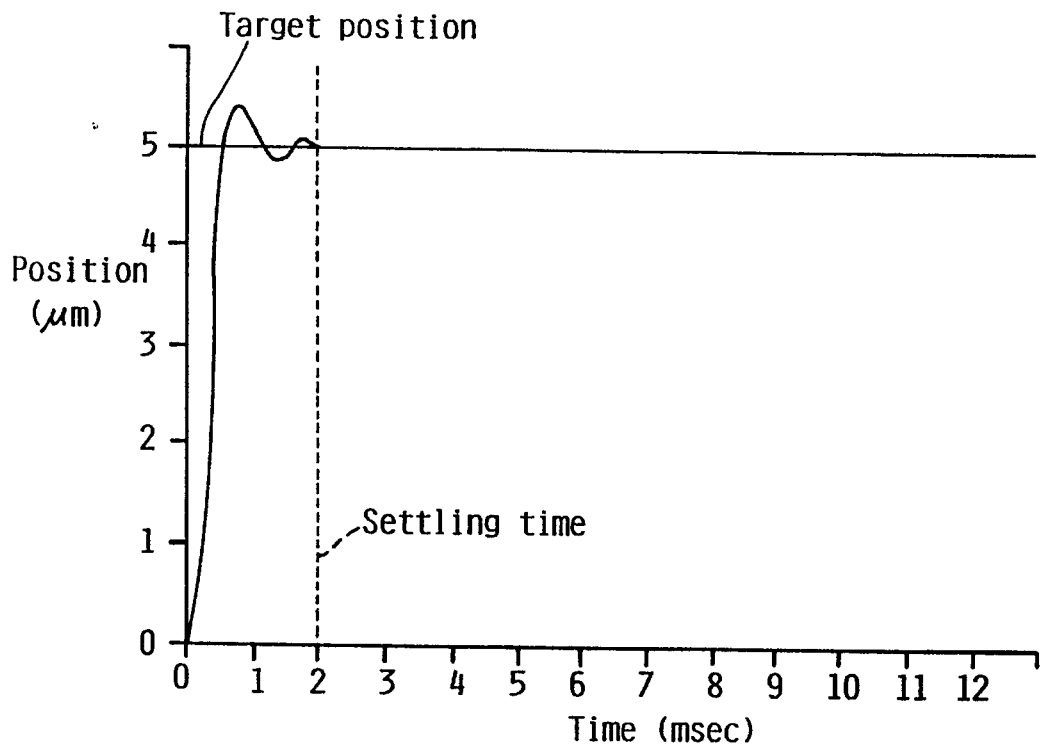
FIG. 6 is a graph showing a time (positioning time) necessary for one track seek in the apparatus for writing servo tracks of a magnetic disk unit according to the second embodiment of the invention.

With reference to FIGS. 4–6, a method and apparatus for writing servo tracks of a magnetic disk unit according to a second embodiment is described below.

This embodiment is an improved version of the method and apparatus for writing servo tracks of a magnetic disk unit according to the first embodiment. In the servo track writing method of the first embodiment, to position the head 14, the capacitance probe 28 is moved by rotationally driving the rotary positioner 26 every one-track seek. However, since the inertial mass of the rotary positioner 26 is 1,000 times larger than that of the rotary actuator 12 of the magnetic disk unit 2, the settling time of the transient response in the positioning (seek) of the head 14 eventually depends on the long settling time of the rotary positioner 26. Therefore, if the positioning of the head 14 can be performed in the reduced number of times of driving the rotary positioner 26, the settling time of the transient response in the seek of the head 14 can be reduced to shorten the time necessary for the servo track writing step.

To summarize the servo track writing method of this embodiment, in the measurement range in which the linearity of the output of the capacitance probe 28 is maintained, that is, in the 165±50 μm range of the distance between the tip face of the capacitance probe 28 and the side face of the head arm end portion 22, the seek of the head 14 is performed every track by supplying a current to the VCM 16 of the rotary actuator 12 and the servo track writing is effected without moving the rotary positioner 26, i.e., with the capacitance probe 28 staying at a predetermined position. During this operation, the gap between the staying capacitance probe 28 and the moving head arm end portion 22 is measured correctly by the capacitance probe 28 and the measured gap is fed back to the VCM 16 to effect the control so that the head 14 is positioned accurately.

The servo track writing apparatus of this embodiment has the same constitution as that of the first embodiment shown in FIGS. 1 and 2 except for the alteration of the servo system. Therefore, descriptions for the parts of the servo track writing apparatus of this embodiment that are the same as in the first embodiment are omitted here.

FIG. 4 is a block diagram showing the operation of the servo system of the apparatus of this embodiment for writing servo tracks of a magnetic disk unit. FIG. 5 is a graph showing the servo track writing method of this embodiment.

The servo system of the servo track writing apparatus of this embodiment consists of a rotary positioner control section 38 for controlling the rotary positioner 26, a VCM control section 40 for controlling the VCM 16, and a controller 34 for inputting target values to those sections.

The rotary positioner control section 38 includes the DC motor 30 for rotationally driving the rotary positioner 26 based on the position instruction from the controller 34, and the laser rotary encoder 32 for measuring and feeding back the movement value (rotation angle) of the rotary positioner 26.

The VCM control section 40 includes an A/D converter 36 converts the digital position instruction, which is input from the controller 34 every one-track seek of the head 14, to an analog signal, the VCM 16 of the rotary actuator 12 for driving the head 14 of the magnetic disk unit 2 based on the position instruction from the A/D converter 36, and the capacitance probe 28 for measuring and feeding back the gap between the tip face of the capacitance probe 28 and the side face of the head arm end portion 22.

With reference to FIGS. 4 and 5, an example of the operation of the servo track writing apparatus of this embodiment is described below. The abscissa of FIG. 5 represents track numbers (increasing from the outside to the inside of the disk 8) of servo tracks for servo pattern writing. The ordinate represents the gap between the tip face of the capacitance probe 28 and the side face of the head arm end portion 22.

In this embodiment, the pitch of the tracks for servo pattern writing is 5 μm. The capacitance probe 28 used in this embodiment is the same as in the first embodiment, and has the linearity being maintained in the gap range of 165±50 μm.

First, after the gap between the tip face of the capacitance probe 28 and the side face of the head arm end portion 22 is set at 115 μm, the head 14 is positioned at track 0 and a servo pattern is written to track 0.

Next, with the capacitance probe 28 staying as it is, a current is supplied to the VCM 16 to drive the actuator 12 so as to effect 5 μm seek of the head 14 in the direction opposite to the capacitance probe 28. During this operation, the VCM current is feedback-controlled so that the gap detected by the capacitance probe 28 becomes 120 μm, to thereby position the head 14 at track 1. In this manner, the positioning of the head 14 is performed by driving the rotary actuator 12 by supplying a current to the VCM 16, and the positioning control is performed by feeding back the gap measured by the staying capacitance probe 28. By repeating the similar operation until the gap reaches 215 μm, servo patterns of 20 tracks can be written with the capacitance probe 28, i.e., the rotary positioner 26 staying as it is. Each one-track seek of the head 14 associated with the driving by the VCM 16 is indicated by a dotted line in FIG. 5.

Next, with the VCM 16 not being energized, the controller 34 sends a position instruction to move the tip face of the capacitance probe 28 by 100 μm toward the head arm end portion 22 to the DC motor 30 of the rotary positioner 26. The rotation angle of the DC motor 30 is controlled with feedback of an error signal that is produced based on the positional information measured by the laser rotary encoder 32, so that the rotary positioner 26 is rotated exactly by the predetermined movement value. With the rotation of the rotary positioner 26, the capacitance probe 28 also rotates exactly by the predetermined movement value and positioned at the predetermined position. Thus, the gap between the tip face of the capacitance probe 28 and the side face of the head arm end portion 22 returns to 115 μm. The movement of the capacitance probe 28 associated with the driving by the rotary positioner 26 is indicated by solid lines in FIG. 5.

The above operation is repeated until servo patterns are written to all the tracks. According to this method, the number of times of driving the rotary positioner 26 having a large inertial mass can be reduced to 1/20 that of the first embodiment for 4,000 tracks.

Figure 12:
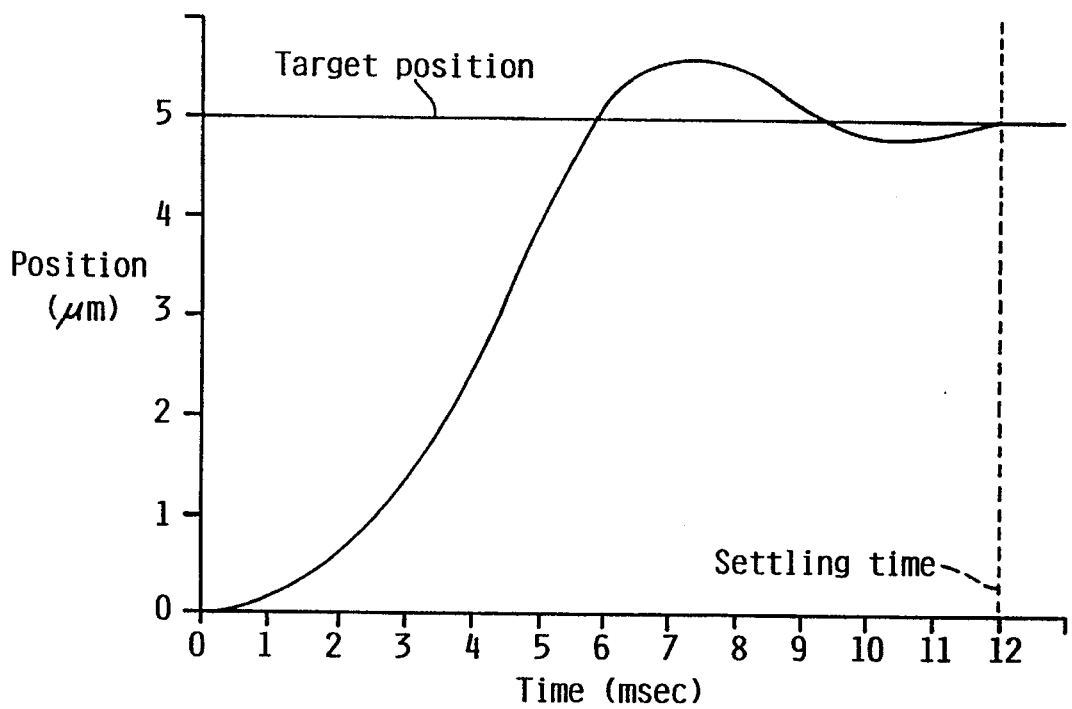
FIG. 12 is a graph showing a time (positioning time) necessary for one track seek in the conventional apparatus for writing servo tracks of a magnetic disk unit.

According to the servo track writing method and apparatus of the invention, the improvement of the transient response of the seek time can be attained, which has been difficult simply by using the rotary positioner 26 that is a noncontacting positioning probe. As shown in FIG. 6, the time necessary for one-track seek of 5 μm (i.e., positioning time) can be reduced from the conventional value of 12 milliseconds (see FIG. 12) to 2 milliseconds. As a result, the throughput of the step of writing servo tracks of the magnetic disk unit can be improved.

In the first and second embodiments, since the head arm end portion 22 and the actual head 14, both of which rotate about the pivot 10 as the positioning reference point, are spaced from each other by the length of the head support member 24, there may occur Abbe's error. But this error is negligibly small.

While in the second embodiment the head 14 is moved in the direction of increasing the gap, it is apparent that the control can also be performed in the opposite direction.

Figure 7:
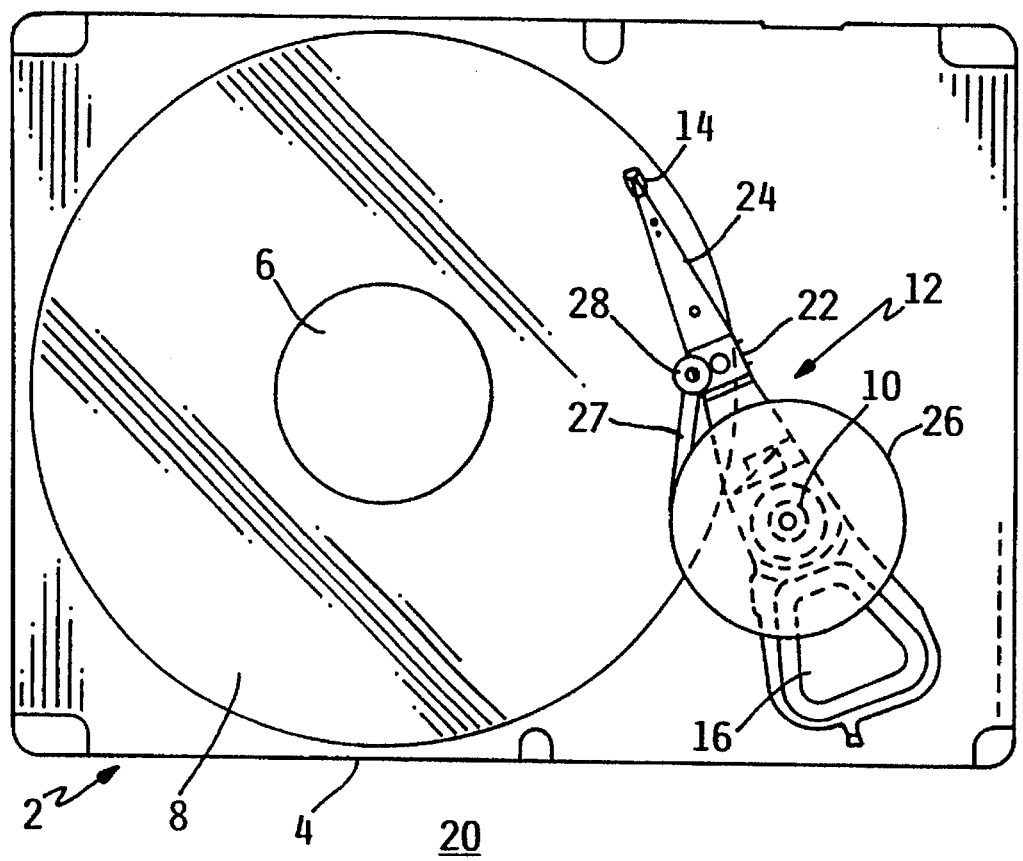
FIG. 7 is a plan view of an apparatus for writing servo tracks of a magnetic disk unit according to a third embodiment of the invention.
Figure 8:
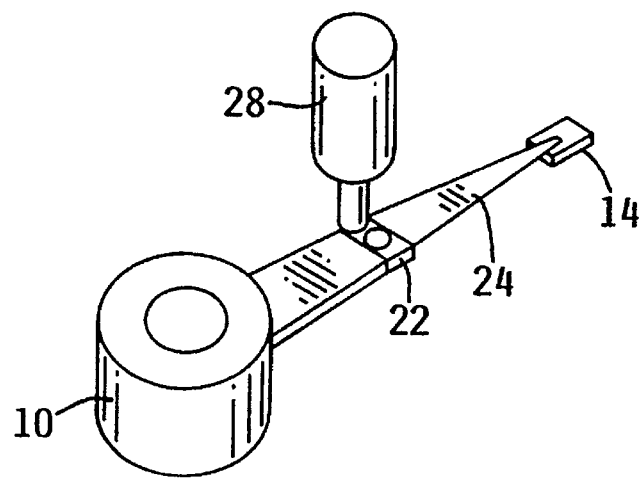
FIG. 8 is a perspective view of the apparatus for writing servo tracks of a magnetic disk unit according to the third embodiment of the invention.

With reference to FIGS. 7–10, a method and apparatus for writing servo tracks of a magnetic disk unit according to a third embodiment is described below. As shown in FIGS. 7 and 8, the servo track writing method and apparatus of this embodiment is characterized in that the capacitance probe 28 is placed above an edge portion of the head arm end portion 22 that is a part of the head support member 24 of the magnetic disk unit 2 perpendicularly to the top surface of the head arm end portion 22. Descriptions for the components already described in the first and second embodiment are omitted here.

With reference to FIG. 9, the principle of the method of this embodiment for writing servo tracks of a magnetic disk unit is described below.

Figure 9A:
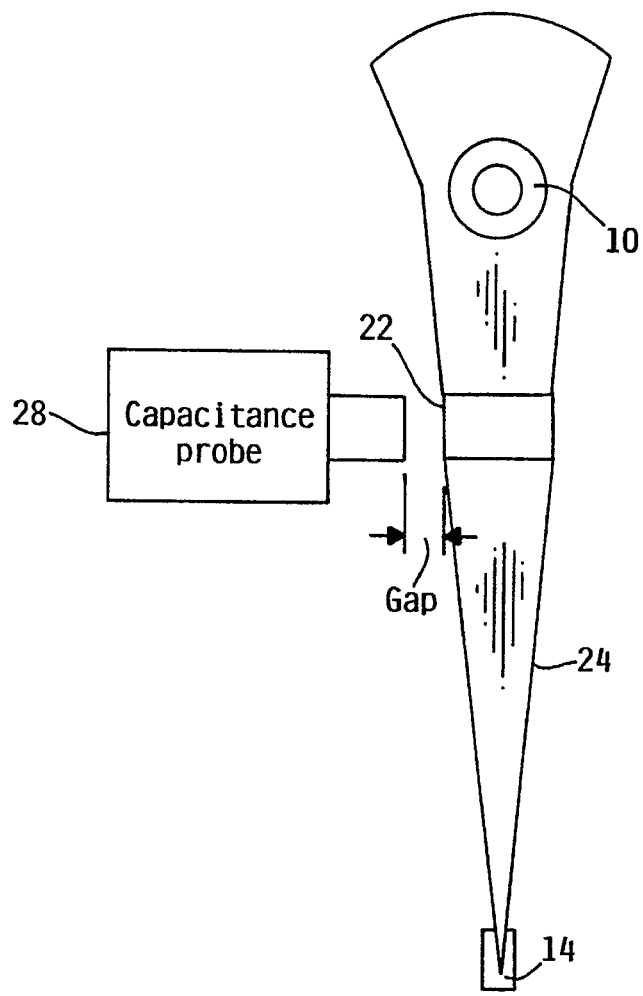
FIGS. 9(a) and (b) illustrate the principle of the apparatus for writing servo tracks of a magnetic disk unit according to the third embodiment of the invention.

As described in the first and second embodiments and shown in FIG. 9(a), originally the capacitance probe 28 is used to measure the gap between its tip face and the side face of the head arm end portion 22 precisely in a noncontacting manner.

In the above method of using the capacitance probe 28, the distance between the side face of the head arm end portion 22 and the tip detecting face of the capacitance probe 28 is measured by opposing those face in a parallel manner. However, in a compact magnetic disk unit or the like in which the head arm is incorporated in a complex mechanism, it is in many cases difficult to make the tip face of the capacitance probe 28 come into proximity to the side face of the head arm end portion 22 in a correct manner. Further, in order to bring the capacitance probe 28 to the position in the vicinity of the side face of the head arm end portion 22, it may be necessary to widen an opening for the servo track writing that is formed in a top cover of the magnetic disk unit 2.

Figure 9B:
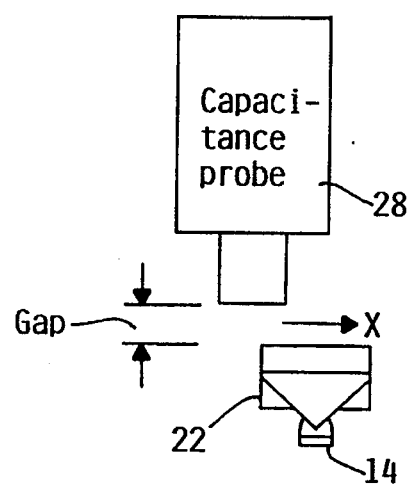

Considering the above, in this embodiment, the capacitance probe 28 is attached to the rotary positioner 26 so that the tip face of the capacitance probe 28 becomes in parallel with the top face of the head arm end portion 22 (see FIG. 9(b)). An adjustment is made so that the tip face of the capacitance probe 28 is placed above the edge portion of the head arm end portion 22.

When the rotary positioner 26 is rotationally driven so as to move to the target position, the capacitance probe 28 moves accordingly in the X-direction (head moving direction) in FIG. 9(b). If an output of the capacitance probe 28 with a positional relationship between the tip face of the capacitance probe 28 and the top face of the edge portion of the head arm end portion 22 before the driving is employed as an initial value, a difference between the initial value and a signal that is output from the capacitance probe 28 with its movement indicates a deviation in the head movement direction between the capacitance probe 28 and the edge portion of the head arm end portion 22. That is, in the servo track writing using the capacitance probe 28 based on the above-described principle, the VCM 16 is feedback-controlled by detecting the deviation in the head moving direction.

Figure 10:
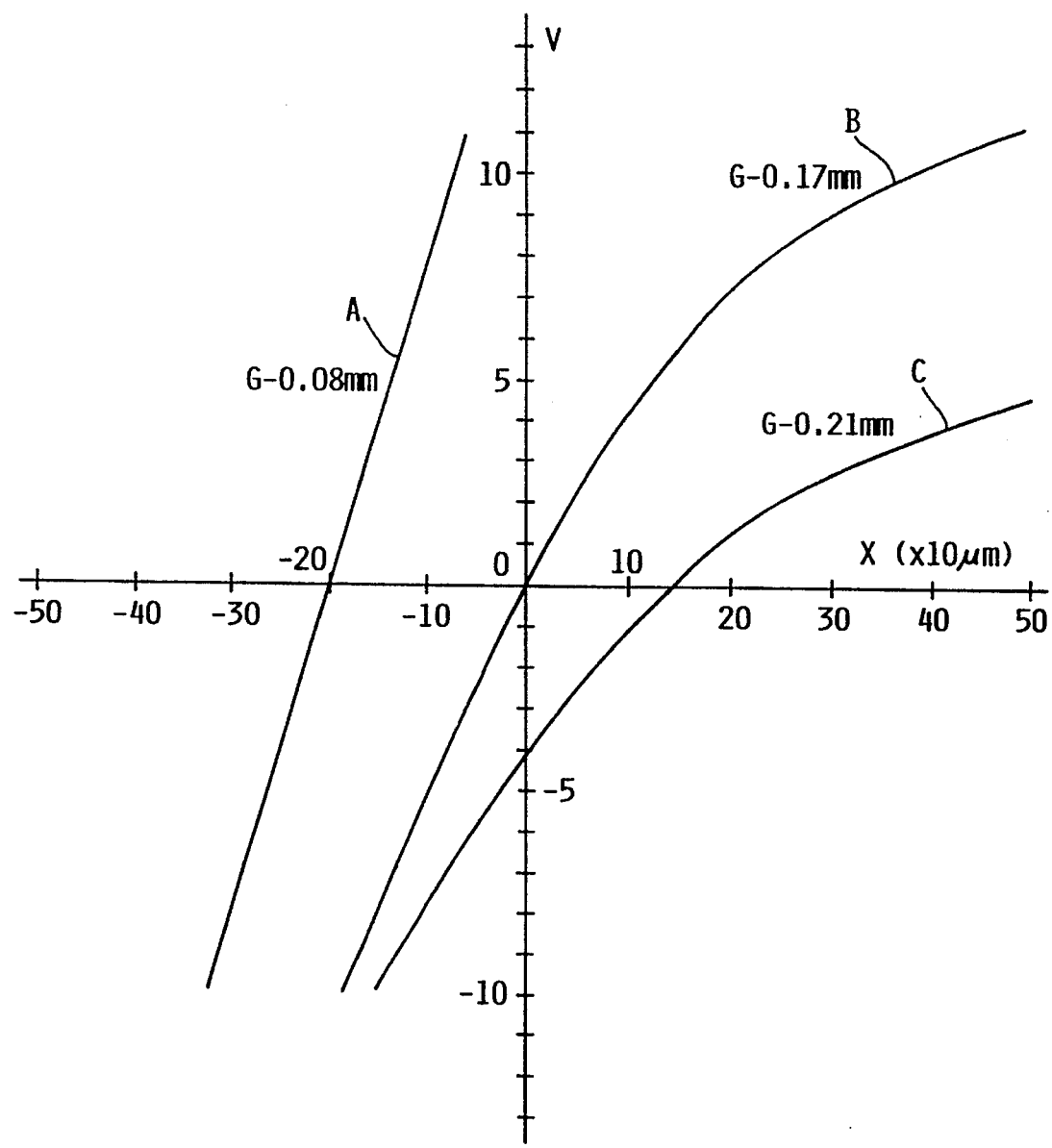
FIG. 10 is a graph showing characteristics of a capacitance probe used in the third embodiment of the invention.
Figure 11:
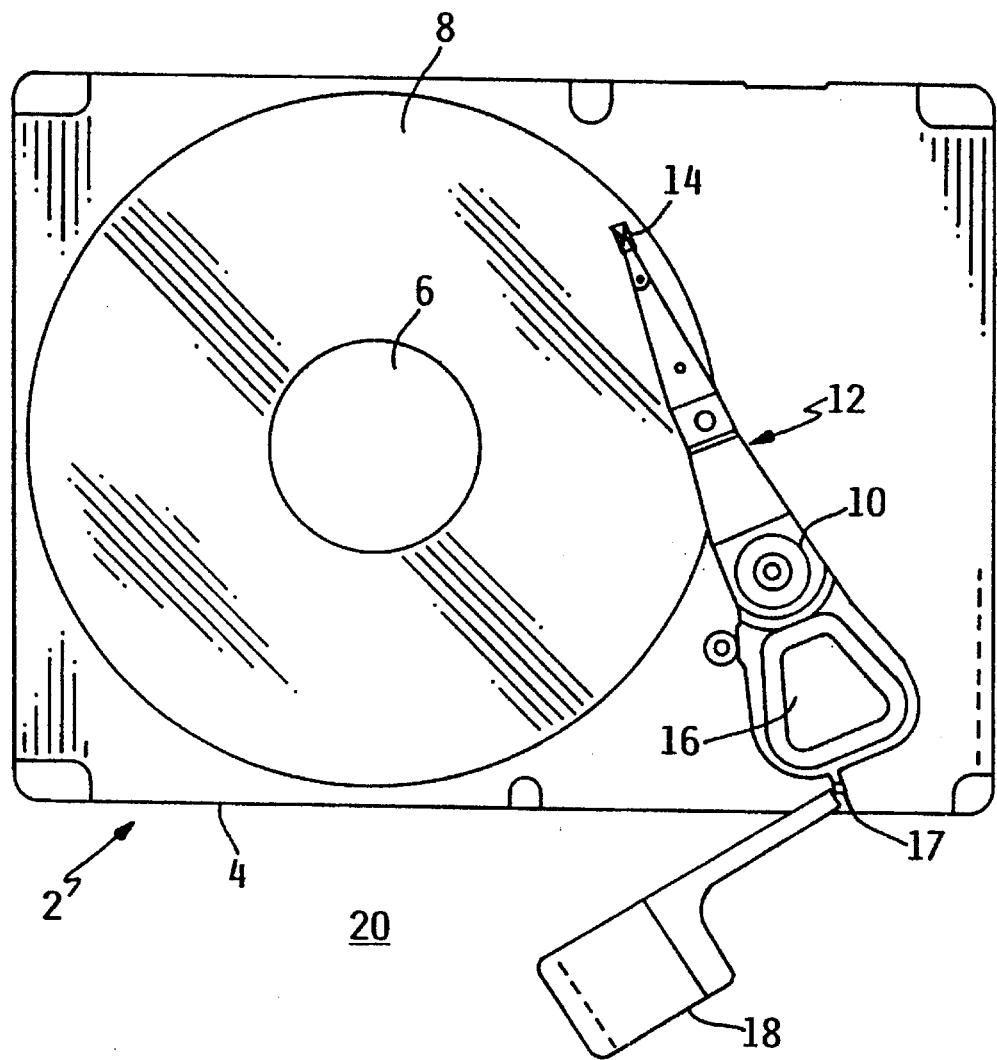
FIG. 11 is a plan view of a conventional apparatus for writing servo tracks of a magnetic disk unit.

FIG. 10 shows characteristics of the capacitance probe 28 used in this embodiment. From FIG. 10, we can see a usable range of the gap G to be initially set between the capacitance probe 28 and the head arm end portion 22 in the case where the capacitance probe 28 is moved in the X-direction (head movement direction.). The abscissa represents a movement distance in the X-direction of the capacitance probe 28 with the head arm end portion 22 staying as it is. The ordinate represents the output of the capacitance probe 28. Curves A, B and C in FIG. 10 indicate relationships between the movement distance in the X-direction and the output 14 level (gain) in the cases where the gap G is 0.08 mm, 0.17 mm and 0.21 mm, respectively.

Where the gap G is 0.08 mm, the gain changes linearly with a rate of change of 4 V/50 μm. Where the gap G is 0.17 mm, a rate of change in the linear portion of the gain curve is 4 V/100 μm. Where the gap G is 0.21 mm, a rate of change in the linear portion of the gain curve is 4 V/150 μm. The gap G smaller than 0.08 mm is associated with a too large rate of change of the gain, and is therefore not suitable for the servo system. On the contrary, the gap G larger than 0.21 mm is associated with a too small rate of change of the gain, and is also not suitable for the servo system. If the gap G within the range of 0.08 to 0.21 mm, the VCM 16 of the magnetic disk unit 2 can easily be controlled by detecting the deviation from the capacitance probe 28 and feeding back the resulting output.

A method of adjusting the gap G between the capacitance probe 28 and the top surface of the edge portion of the head arm end portion 22 is described below. First, the magnetic disk unit 2 to be subjected to the servo track writing is set on the stone surface plate 20 at a predetermined position. With the tip face of the capacitance probe 28 placed above a portion of the head arm end portion 22 other than the edge portion, the gap between the tip face of the capacitance probe 28 and the top face of the head arm end portion 22 is measured by a method similar to that of the first embodiment. The height of the magnetic disk unit 2 is adjusted so that the gap G takes a predetermined value within the 0.08 to 0.21 mm range. Then, the capacitance probe 28 is moved in the head moving direction so that the tip face of the capacitance probe 28 is located above the top face of the head arm end portion 22.

As described above, according to this embodiment, the servo track writing method and apparatus can be realized which is more properly adapted for use in the actual manufacturing process.

The present invention is not limited to the above embodiments, but various modifications are possible.

For example, while in the above embodiments the invention is applied to the rotary actuator type magnetic disk unit, it is naturally possible to apply the invention to the linear actuator type magnetic disk unit. In the latter case, the capacitance probe is combined with the linear positioner instead of being combined with the rotary positioner in the above embodiments.

While in the above embodiments the capacitance probe is used as the gap detecting means, other noncontacting position detectors, such as an optical sensor, can also be used as long as they have sufficient measurement accuracy.

While in the first and second embodiments the head arm end portion 22 is used as the detecting area of the gap detection by the capacitance probe 28, the invention is not limited to this case. Other faces, for instance, the side face of the head support member 24 etc., can also be used as the detecting area as long as they are metal faces.

Similarly, while in the third embodiment the edge portion of the head arm end portion 22 is used as the detection area of the gap detection by the capacitance probe 28, the invention is not limited to this case. Other edge portions, for instance, the edge of the head support member 24 etc., other edges of the head arm and the edge of an opening formed in the head arm top surface, can also be used as the detecting area as long as they are made of metal.

As described above, according to the invention, the mechanical vibration of the head in the steady state can be reduced. The throughput of the step of writing servo tracks of a magnetic disk unit can be improved by shortening the system settling time in the servo track writing operation. Further, the servo track writing method and apparatus can be realized which is more properly adapted for use in the actual manufacturing process.

What is claimed is:

1. A method for writing servo tracks of a disk drive, comprising the steps of:

setting a detecting portion in the vicinity of a head support member of said disk drive in a noncontacting manner;

moving said detecting portion to a first target position within the measurement range of said detecting portion;

detecting a gap between said detecting portion and said head support member;

moving a head of said disk drive so that said gap is at a second predetermined gap distance;

maintaining the gap distance substantially constant to maintain said head at a first predetermined servo track writing position;

moving a head of said disk drive so that said gap is at a second predetermined gap distance;

maintaining the gap distance substantially constant to maintain said head at a second predetermined servo track writing position; and moving said detecting portion to a second target position within the measurement range of said detecting portion when the gap distance with respect to the first target position is nearing the outer limit of the measurement range.

2. A method for writing servo tracks of a disk drive, comprising the steps of:

setting a detecting portion in the vicinity of a head support member of said disk drive in a noncontacting manner;

detecting a gap between said detecting portion and said head support member, wherein the detection of said gap distance is performed in a range where the output of said detecting portion is maintained over the functional range;

positioning a head of said disk drive at a first servo track writing position by controlling a head drive system of said disk drive to maintain a first gap distance; and positioning a head of said disk drive at a second servo track writing position by controlling a head drive system of said disk drive to maintain a second gap distance, said detecting portion having a limited range over which the output which is a function of the gap distance, wherein when said detecting portion reaches one measurement limit of said limited range, said detecting portion is moved to the other measurement limit of said limited range.

3. A method for writing servo tracks of a disk drive, comprising the steps of:

setting a detecting portion near an edge portion of a head support member of said disk drive in a noncontacting manner;

moving said detecting portion to position it at a first target position while detecting a deviation between said detecting portion and said edge portion;

maintaining a head of said disk drive at a first noncontact position so that said deviation is kept substantially constant, to position said head at a predetermined servo track writing position while writing a servo track signal maintaining a head of said disk drive at a second noncontact position so that said deviation is kept substantially constant, to position said head at a predetermined servo track writing position while writing a servo track signal, said first and second noncontact positions being within a measurement range of said detecting portion;

moving said detecting portion to position it at a second target position while detecting a deviation between said detecting portion and said edge portion, said detecting portion moved to said second target position after the edge portion of the head support member moves away from the first target position to a position where the detecting portion nears its outer measurement limit; and maintaining a head of said disk drive at a first noncontact position with respect to the second target position so that said deviation is kept substantially constant, to position said head at a predetermined servo track writing position while writing a servo track signal.

4. An apparatus for writing servo tracks of a disk drive, comprising:

gap detecting means further comprising a detecting portion located in the vicinity of a head support member of said disk drive in a noncontacting manner, for detecting a gap between said detecting portion and said head support member;

positioning means for moving said gap detecting means to a first target position within the measurement range of said gap detecting portion;

head moving means for maintaining a head of said disk drive so that said gap is kept constant, to position said head at a first predetermined servo track writing position and a second predetermined servo track writing position with respect to said first target position;

positioning means for moving said gap detecting means to a second target position within the measurement range when the gap detecting means nears the outer limit of its measurement range with respect to the first target position; and head moving means for maintaining a head of said disk drive so that said gap is kept constant, to position said head at a first predetermined servo track writing position and a second predetermined servo track writing position with respect to said second target position.

5. The apparatus of claim 4, wherein said head moving means further comprises head drive system control means for controlling a head drive system of said disk drive by feed back of a signal related to said detected gap.

6. The apparatus of claim 5, wherein said gap detecting means is a capacitance probe.

7. The apparatus of claim 6, wherein said positioning means further comprises position control means for performing feedback control by detecting a current position of said gap detecting means.

8. The apparatus of claim 7, wherein said positioning means is a rotary positioner.

9. The apparatus of claim 4, wherein said positioning means further comprises position control means for performing feedback control by detecting a current position of said gap detecting means.

10. An apparatus for writing groups of servo tracks of a disk drive, comprising:

edge detecting means having a detecting portion located in the vicinity of an edge portion of a head support member of said disk drive in a noncontacting manner, for detecting a deviation between said detecting portion and said edge portion, said edge detecting means located at a first target position;

means for determining when the deviation between said detecting portion and said edge portion is within the limits of the measurement range of said detecting portion;

positioning means for moving said edge detecting means to a second target position within the measurement range of said edge detecting means in response to means for determining when the deviation between said detecting portion and said edge portion is nearing the outer limit of the measurement range of said detecting portion; and head moving means capable of moving a head of said disk drive to keep said deviation constant to position said head at a predetermined servo track writing position, said head moving means moving to a first position and a second position corresponding to servo tracks within one of said groups of servo tracks.

11. The apparatus of claim 10, wherein said head moving means further comprises head drive system control means for controlling a head drive system of said disk drive by feeding back a signal related to said detected gap.

12. The apparatus of claim 11, wherein said gap detecting means is a capacitance probe.

13. The apparatus of claim 11 wherein said capacitance probe is obliquely positioned with respect to a top surface of said head support member.

14. The apparatus of claim 10, wherein said positioning means further comprises position control means for performing feedback control by detecting a current position of said edge detecting means.

15. The apparatus of claim 14, wherein said positioning means is a rotary positioner.

* * * * *

UNITED STATES PATENT AND TRADEMARK OFFICE
CERTIFICATE OF CORRECTION

PATENT NO. : 5,610,777

DATED : March 11, 1997

INVENTOR(S) : Hien P. Dang, Takahiro Nakagawa, Yoshiyasu Nakamoto, Muthuthamby Sri-Jayantha, Hiroyuki Suzuki It is certified that error appears in the above-identified patent and that said Letters Patent is hereby corrected as shown below:

Claim 1, Col. 11, Line 46, "second" should be --first--.

Signed and Sealed this

Fifteenth Day of July, 1997

*Attest:*

BRUCE LEHMAN

*Attesting Officer*  Commissioner of Patents and Trademarks